United States Patent
Beyer et al.

(10) Patent No.: US 7,709,978 B2
(45) Date of Patent: May 4, 2010

(54) SYSTEM INTERFACE AND INSTALLATION WITH THE SYSTEM INTERFACE

(75) Inventors: Stefan Beyer, Ebermannsdorf (DE); Josef Graf, Hahnbach (DE); Peter Hauselt, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 256 days.

(21) Appl. No.: 11/896,556

(22) Filed: Sep. 4, 2007

(65) Prior Publication Data
US 2008/0054730 A1   Mar. 6, 2008

(30) Foreign Application Priority Data
Sep. 5, 2006   (EP)   ................... 06018570

(51) Int. Cl.
G01R 1/20 (2006.01)
H02J 1/00 (2006.01)
G05B 11/01 (2006.01)

(52) U.S. Cl. .......................... 307/154; 307/21; 307/29; 307/36; 307/113; 307/139; 700/19

(58) Field of Classification Search ............ 307/18, 307/19, 21, 23, 25, 29, 36, 37, 72, 113, 139, 307/154; 700/19
See application file for complete search history.

(56) References Cited

U.S. PATENT DOCUMENTS 6,525,432 B2 * 2/2003 Heckmann et al. ......... 307/10.1
6,775,767 B2 * 8/2004 Hinrichs et al. ................ 713/1
7,042,117 B2 * 5/2006 Takahashi .................... 307/65
2005/0110618 A1   5/2005 Creff
2006/0190155 A1 * 8/2006 Meyer et al. .................. 701/54

FOREIGN PATENT DOCUMENTS

DE   199 15 253   4/1999
DE   102 06 222   9/2003

OTHER PUBLICATIONS

European Search Report.

* cited by examiner

Primary Examiner—Albert W Paladini
Assistant Examiner—Hal I Kaplan
(74) Attorney, Agent, or Firm—Harness, Dickey & Pierce, P.L.C.

(57) ABSTRACT

It is normal practice in automation to network individual components of an installation via bus lines, with this network carrying out a multiplicity of communication and supply tasks during operation. In at least one embodiment, a system interface, as well as an installation which uses this interface, are disclosed with the operational reliability of the installation being improved. In at least one embodiment, a system interface is proposed for connection of a bus line to an actuator assembly in a control system with a K connection for connection of a communication channel and with a K-U connection for connection of a communication voltage supply channel, and an A-U connection for connection of an actuator voltage supply channel.

17 Claims, 1 Drawing Sheet

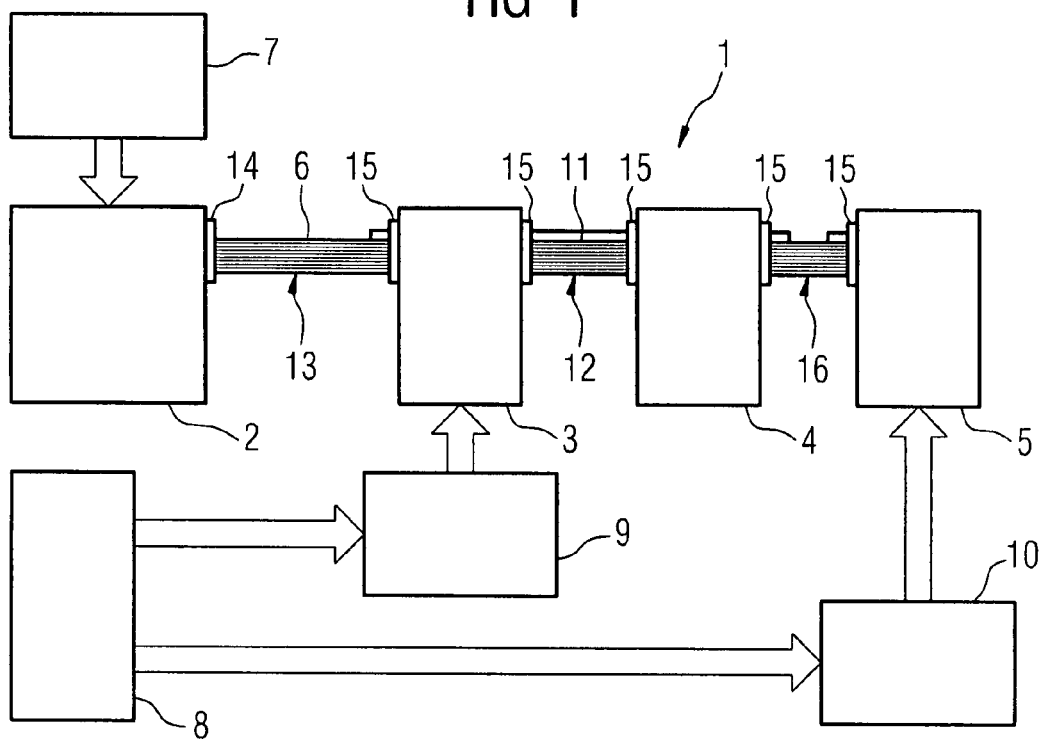
FIG 1
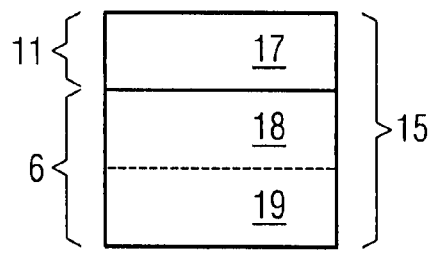
FIG 2
FIG 3
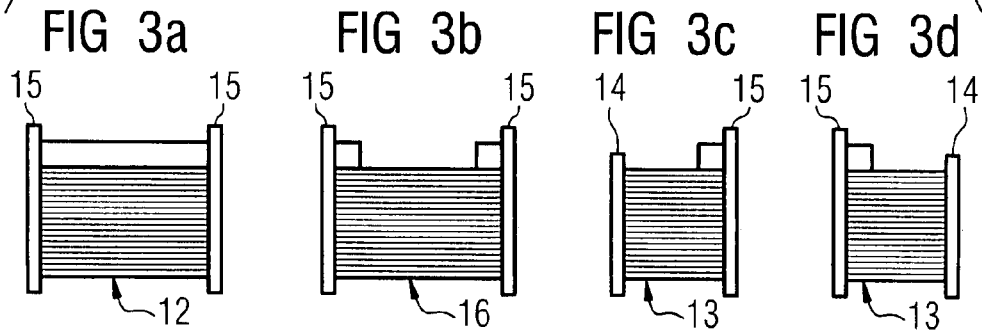

SYSTEM INTERFACE AND INSTALLATION WITH THE SYSTEM INTERFACE

PRIORITY STATEMENT

The present application hereby claims priority under 35 U.S.C. §119 on European patent application number EP 06018570 filed Sep. 5, 2006, the entire contents of which is hereby incorporated herein by reference.

FIELD

Embodiments of the invention generally relate to a system interface for connection of a bus line to an actuator assembly in a control system with a K connection for connection of a communication channel and with a K-U connection for connection of a communication voltage supply channel, and/or to an installation which uses this system interface.

BACKGROUND

It is normal practice in automation to network individual components of an installation via bus lines, with this network carrying out a multiplicity of communication and supply tasks during operation.

By way of example, the so-called actuator-sensor interface (AS interface) is known for networking purposes in specialist circles, one embodiment of which is also marketed by the applicant. The AS interface is the basis of a modular networking system for sensors and actuators in the lowest field range. In order to network the actuators and sensors, they are connected via a common two-wire line, in which both the supply voltage for the sensors and the actuators as well as communication signals are transmitted.

SUMMARY

In at least one embodiment, the invention proposes a system interface and/or an installation which uses this interface, with the operational reliability of the installation being improved.

A system interface is proposed for connection to an actuator assembly in an installation. The system interface is preferably an integral component of the actuator assembly. The expression an actuator assembly means in particular a component which carries out or initiates a control movement using an actuator supply voltage. By way of example, the control movement may be the switching of a relay, the starting of a motor or the like. In particular, the actuator assembly is in the form of a motor starter or a motor controller.

Physically, the system interface is in the form of a plug or socket.

In particular, the actuator assembly has two system interfaces, with one of the two system interfaces preferably being designed as descried in the following text, and with the other system interface being designed either analogously or in a conventional, known manner. One of the system interfaces is in this case used as an input interface, and the other system interface is used as an output interface, for the actuator assembly.

The system interface has a K connection for connection of a communication channel, with the communication channel being provided by way of the bus line. Furthermore, the system interface has a K-U connection for connection of a communication voltage supply channel which is likewise formed by the bus line. The communication voltage supply channel carries the supply voltage for the actuator assembly, for communication purposes.

According to at least one embodiment of the invention, the system interface also has an A-U connection which is suitable and/or is designed for connection of an actuator voltage supply channel. The system interface therefore includes all of the connections for two mutually independent supply voltages. In one optional embodiment, the system interface includes only the three connections that have been mentioned.

At least one embodiment of the invention is based on the idea that the interface, which has been mentioned in the introduction, was originally developed only for the networking of sensors, and does not provide an actuator voltage supply. However, in a production process, it is necessary to be able to switch off an actuator assembly or installation parts via emergency-off apparatuses, for example in the event of a malfunction or a hazard to personnel. However, in order to ensure that the actuator assembly is switched off safely using the interface known from the prior art, the entire communication voltage supply must be disconnected, that is to say deactivated. However, in addition to the deactivation of the actuator assembly, this additionally leads to a communication collapse, since this is fed from the same source. Known interfaces therefore do not allow fault diagnosis to be carried out for the actuator assembly to determine whether a malfunction has occurred and/or whether an emergency-off apparatus has been activated, or whether there is just a communication fault. Fault diagnosis, which represents the necessary functionality for a smooth production process for the user, therefore cannot be carried out unambiguously, particularly in the case of an emergency-off in an installation.

According to at least one embodiment of the invention, an additional A-U connection is proposed in the system interface, and is designed for connection of an actuator voltage supply. A system interface designed in this way is used to maintain communication despite an emergency-off in a part of the installation, since the emergency-off deactivates only the actuator voltage supply but not the communication voltage supply. Thus, in at least one embodiment, a controller is always able to check the instantaneous status of the actuator assembly, and/or the actuator assembly is always able to send its instantaneous status via the communication channel to a controller.

In summary, it is therefore possible to switch off the actuator assembly via an emergency-off safely, and additionally for the controller to receive and evaluate this status via the communication channel. As an alternative to an emergency-off, other apparatuses are used which result in the actuator assembly or assemblies being switched off. For example, it or they can also be switched off by a controller.

In one example embodiment, the K-U connection and the A-U connection are floating. When the system interface is integrated in an installation, provision is preferably made for the communication voltage supply channel and the actuator voltage supply channel to likewise be floating.

The problem on which at least one embodiment of the invention is based is also solved by an installation which includes at least two actuator assemblies and a bus line for connection of the two actuator assemblies, with the bus line having a communication channel and a communication voltage supply channel, and with the at least two actuator assemblies each having one system interface as described above. This results in an installation which exploits at least one of the advantages mentioned above.

In one expedient development of the installation, the communication channel and the communication voltage supply channel in the bus line are in the form of a two-wire line. This development is often used for existing installations which make use of the AS interface known from the prior art.

According to a further embodiment, an actuator voltage supply channel is added to the bus line. In particular, the actuator voltage supply channel is in the form of a further line, so that the bus line is in the form of a three-wire line, at least in places. In this embodiment, the communication voltage supply and the actuator voltage supply are passed from one actuator assembly to another in a floating form and independently of one another via the bus line.

Preferably, and in accordance with the technical standard, the communication voltage supply and/or the actuator voltage supply are/is 24 volts.

In principle, the actuator supply voltage can be fed into the installation at any desired point, for example via an adapter cable directly into the bus Line or via a connection to the actuator assembly. However, it is preferable for the actuator voltage supply to be fed in with the interposition of an emergency-off apparatus. This ensures that, when the emergency-off apparatus is operated, the actuator voltage supply is deactivated or disconnected without adversely affecting the functionality of the communication channel or of the communication voltage supply channel. In this embodiment, notification of operation of the emergency-off apparatus can be transmitted via the communication channel, for example to a controller.

In one expedient development of the installation, a control apparatus is provided for driving the at least two actuator assemblies, with the control apparatus being designed or arranged such that it is insulated or isolated from the actuator voltage supply channel. In other words, the interface of the control apparatus has only one K connection and one K-U connection, and no A-U connection. This expedient development also takes account of the fact that existing installations have control apparatuses which have an interface according to the prior art.

In one advantageous development of the installation, further actuator assemblies are provided and are connected to the at least two actuator assemblies and/or to the control apparatus via the communication channel and the communication voltage supply channel. By way of example, this connection may be in the form of a tree, star or linear network structure. The further actuator assemblies are additionally networked with one another via a second actuator voltage supply channel, which is formed independently of the already mentioned actuator voltage supply channel and is supplied in particular with the actuator supply voltage via a different source.

The at least two actuator assemblies and the further actuator assemblies preferably form two mutually independent emergency-off circuits. Further emergency-off circuits are, of course, also possible by means of further actuator assemblies. The advantage of this architecture is that parts of the installation can each be associated with their own emergency-off circuits, and can be deactivated selectively via emergency-off apparatuses. Even when there are a plurality of independent emergency-off circuits, the functionality of the communication channel and of the communication voltage supply channel are ensured at all times since the emergency-off operation does not adversely affect the communication link.

In particular, provision is made for the at least two mutually independent emergency-off circuits to be isolated from one another via an interruption bus line and/or an adapter bus line. The specific bus lines mentioned have a termination for the actuator voltage supply channel and/or for the second actuator voltage supply channel, so that the independent emergency-off circuits are isolated from one another, in terms of the actuator supply voltage channel.

In summary, the advantages of at least one embodiment of the invention include that the continuously maintained communication means that any communication faults which may occur are not incorrectly interpreted as an emergency-off situation. Since the actuator voltage supplies can be fed into the installation at any desired point, it is possible to use adapter and/or interruption bus lines to provide separate emergency-off circuits for an installation, in particular within a communication network, or to provide these in a switchgear cabinet. In order to implement the connection, bus lines that are known per se have an actuator voltage supply channel added to them, at least in places. There is no need to modify the interface or the bus line for any control apparatuses or sensor assemblies that may be present, since the proposed networking allows mixed operation of known interfaces with the novel system interface. The integration of the actuator voltage supply channel in the bus line does not necessitate any additional wiring complexity for passing on the actuator voltage supply from one actuator assembly to the next.

BRIEF DESCRIPTION OF THE DRAWINGS

Further features, advantages and effects of the invention will become evident from the following description of example embodiments and from the attached figures, in which:

FIG. 1 shows a schematic block diagram of an installation as a first example embodiment of the invention;

FIG. 2 shows a schematic illustration of the system interface according to an embodiment of the invention in FIG. 1; and FIG. 3 shows various embodiments of bus lines, illustrated schematically.

Mutually corresponding parts and variables are provided with the same reference symbols in each of the following figures.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

FIG. 1 shows a schematic block diagram of the configuration of an installation 1 which has a control apparatus 2 and a total of three actuator assemblies 3, 4 and 5. Further actuator assemblies or sensor assemblies are optionally possible.

The control apparatus 2 is preferably in the form of a master, and the actuator assemblies 3, 4 and 5 are in the form of clients. A communication link 6 is provided in order to establish communication and connects the actuator assemblies 3, 4 and 5 in series, or in a linear form, starting from the control apparatus 2.

The communication link 6 is in the form of a two-wire line, with one line being used as a communication line, and the other line as a communication voltage supply line. The bus formed by the communication link 6 therefore has one communication channel and one communication voltage supply channel, with the communication supply voltage being fed into the communication link 6 from a first voltage source 7 via the control apparatus 2.

A second voltage source 8 is connected as a supplementary supply for the actuator assemblies 3, 4 and 5 and provides an actuator voltage supply via a first emergency-off switch 9, and, in parallel with this, via a second emergency-off switch 10 to the actuator assembly 3 and/or actuator assembly 5. Both the first voltage source 7 and the second voltage source 8 have a voltage level of 24 volts, and are designed to be floating with respect to one another.

The first emergency-off switch 9 and/or the second emergency-off switch 10 are/is designed such that, when operated, they interrupt the voltage supply from the second voltage source 8 to the actuator assembly 3 and/or 5. In order to supply the actuator assembly 4 with the actuator supply voltage, an actuator voltage supply line 11 is provided in addition to the communication link 6 and forms an actuator voltage supply channel between the actuator assembly 3 and the actuator assembly 4. This architecture results in the actuator voltage supply being passed on via the emergency-off switch 9 and then via the actuator assembly 3 to the actuator assembly 4, starting from the second voltage source 8. When the first emergency-off switch 9 is operated, the actuator supply voltage is deactivated both for the actuator assembly 3 and for the actuator assembly 4.

As can be seen from FIG. 1, the actuator assembly 3 and the actuator assembly 4 are connected via a system bus line 12, which includes the communication link 6 and the actuator voltage supply line 11. The connection between the control device 2 and the actuator assembly 3 is in contrast provided via an adapter bus line 13.

The various bus lines are used because the control apparatus 2 has a standard interface 14, which comprises only connections for the communication channel and for the communication supply channel.

In contrast, the actuator assembly 3 or 4 has system interfaces 15 which—in the same way as the standard interface 14—has connections for the communication channel and for the communication voltage supply channel as well as, in addition, a connection for the actuator voltage supply channel.

The system bus line 12 therefore connects two system interfaces 15 while, in contrast, the adapter bus line networks one standard interface 14 with one system interface 15.

Two system interfaces 15 are admittedly still provided for the connection between the actuator assembly 4 and the actuator assembly 5, but both are connected to one another via an interruption bus line 16 which—as will be explained in conjunction with FIG. 3b—establishes only one communication channel and one communication supply voltage channel, but not an actuator supply voltage channel.

The illustrated configuration of the installation 1 has the advantage, inter alia, that components with a standard interface 14 and components with a system interface 15 can be connected to one another.

In functional terms, operation of the first emergency-off switch 9 leads to deactivation of the actuator voltage supply for the actuator assemblies 3 and 4. These are therefore disconnected, to be precise are made non-live. Since the first emergency-off switch 9 acts only on the actuator voltage supply, however, but not on the communication link 6, the control apparatus 2 can check the status of the actuator assemblies 3 and 4 at any time, in particular even when the first emergency-off switch 9 has been operated. Furthermore the described installation 1 allows separate emergency-off circuits to be formed, with the actuator assemblies 3 and 4 forming a first emergency-off circuit which is operated by the first emergency-off switch 9, and with the actuator assembly 5 forming a second emergency-off circuit which is operated by the second emergency-off switch 10.

FIG. 2 shows, once again in the form of a schematic illustration, the configuration of the system interface 15, which has a connection for an actuator voltage supply channel 17 and a connection for a communication channel 18 as well as a connection for a communication voltage supply channel 19. The communication channel 18 and the communication voltage supply channel 19 are connected via the communication link 6. Contact is made with the actuator voltage supply channel 17 via the actuator voltage supply line 11.

FIGS. 3a,b,c,d show enlarged illustrations of different embodiments of the bus line between the control apparatus 2 and the actuator assemblies 3, 4 and 5.

FIG. 3a illustrates the system bus line 12 which connects two system interfaces 15 to one another, with all three possible channels being passed on.

FIG. 3b in contrast shows an interruption bus line 16, which admittedly connects two system interfaces 15 to one another, but with the connections for the actuator voltage supply channel not being connected to one another in this case. An interruption bus line 16 of this type is used, for example, to isolate two emergency-off circuits from one another.

FIGS. 3c and 3d each shown an adapter bus line 13, which in each case connects a standard interface 14 to a system interface 15. While contact is made with the standard interface 14 completely, that is to say for both the communication channel and the communication voltage supply channel, the adapter bus line 13 has only one termination for the actuator voltage supply channel on the side for the system interface 15. This adapter bus line 13 can be used to connect components with a standard interface 14, for example the control device 2 or sensor assemblies (not shown) to actuator assemblies which have a system interface 15.

What is claimed is:

1. An installation, comprising:
   at least two actuator assemblies; and
   a bus line to connect the two actuator assemblies, the bus line including a communication channel and a communication voltage supply channel: and
   a control apparatus, to drive the at least two actuator assemblies, at least one of designed and arranged to be at least one of insulated and isolated from an actuator voltage supply channel, wherein the at least two actuator assemblies each including one system interface for connection of a bus line to an actuator assembly in a control system, the system interface including:
      a K connection for connection of a communication channel;
      a K-U connection for connection of a communication voltage supply channel; and
      an A-U connection for connection of the actuator voltage supply channel.

2. The system interface as claimed in claim 1, wherein the K-U connection and the A-U connection are floating.

3. The installation as claimed in claim 1, wherein the communication channel and the communication voltage supply channel in the bus line are in the form of a two-wire line.

4. The installation as claimed in claim 3, wherein the bus line includes an actuator voltage supply channel.

5. The installation as claimed in claim 1, wherein the bus line includes the actuator voltage supply channel.

6. The installation as claimed in claim 5, wherein at least one of the communication voltage and the actuator voltage is 24 V.

7. The installation as claimed in claim 1, wherein the actuator voltage supply is fed to at least one of into one of the actuator assemblies and into the bus line, with the interposition of an emergency-off apparatus.

8. The installation as claimed in claim 7, wherein a control signal used to control operation of the emergency-off apparatus is transmittable via the communication channel.

9. An installation, comprising:
   the at least two actuator assemblies of claim 1; and
   means for connecting the at least two actuator assemblies, the at least two actuator assemblies each including one system interface as claimed in claim 1.

10. The installation as claimed in claim 9, wherein the means for connecting includes a communication channel and a communication voltage supply channel.

11. The installation as claimed in claim 10, wherein the communication channel and the communication voltage supply channel in the bus line are in the form of a two-wire line.

12. The installation as claimed in claim 10, wherein the means for connecting includes an actuator voltage supply channel.

13. The installation as claimed in claim 12, wherein at least one of the communication voltage and the actuator voltage is 24 V.

14. The installation as claimed in claim 12, wherein the actuator voltage supply is fed at least one of into one of the actuator assemblies and into the means for connecting, with the interposition of an emergency-off apparatus.

15. An installation, comprising:
   at least two actuator assemblies;
   a bus line connected to the at least two actuator assemblies, the bus line including a communication channel and a communication voltage supply channel; and
   at least one further actuator assembly networked with at least one of the at least two actuator assemblies and the control apparatus via the communication channel and the communication voltage supply channel, and being networked with one another via a second actuator voltage supply channel, wherein the at least two
   actuator assemblies each include one system interface for connection of a bus line to an actuator assembly in a control system, the system interface including:
      a K connection for connection of a communication channel:
      a K-U connection for connection of a communication voltage supply channel: and
      an A-U connection for connection of an actuator voltage supply channel.

16. The installation as claimed in claim 15, wherein the at least two actuator assemblies and the further actuator assemblies form two mutually independent emergency-off circuits.

17. The installation as claimed in claim 16, wherein the two mutually independent emergency-off circuits are isolated from one another via at least one of an interruption bus line and one or more adapter bus lines, including a termination for at least one of the actuator voltage supply channel and the second actuator voltage supply channel.

* * * * *